US008983188B1

(12) United States Patent
Lang et al.

(10) Patent No.: US 8,983,188 B1
(45) Date of Patent: Mar. 17, 2015

(54) EDGE-AWARE SMOOTHING IN IMAGES

(71) Applicant: Google Inc., Mountain View, CA (US)

(72) Inventors: Grayson Lang, Santa Clara, CA (US); Krishnendu Chaudhury, Saratoga, CA (US)

(73) Assignee: Google Inc., Mountain View, CA (US)

( * ) Notice: Subject to any disclaimer, the term of this patent is extended or adjusted under 35 U.S.C. 154(b) by 116 days.

(21) Appl. No.: 13/894,390

(22) Filed: May 14, 2013

(51) Int. Cl.
*G06K 9/00* (2006.01)
*G06T 5/00* (2006.01)

(52) U.S. Cl.
CPC ..................... *G06T 5/002* (2013.01)
USPC ......................................... 382/167

(58) Field of Classification Search
USPC ......................................... 382/167
See application file for complete search history.

(56) References Cited

U.S. PATENT DOCUMENTS

| 7,813,582 | B1 | 10/2010 | Chaudhury |
| 8,395,694 | B2 | 3/2013 | Kim |
| 8,406,548 | B2 | 3/2013 | Ali |

FOREIGN PATENT DOCUMENTS

WO 2010029476 A1 3/2010

*Primary Examiner* — Duy M Dang
(74) *Attorney, Agent, or Firm* — IP Spring

(57) ABSTRACT

In some implementations of edge-aware smoothing, a method includes determining a boundary map for an input image, where the boundary map associates one of multiple different labels to each pixel of the input image, and the labels indicate one or more edges in the input image. The method determines a set of input pixels of the input image eligible to influence an output pixel of an output image, the output pixel corresponding to a pixel of the input image. A blurred pixel value for the output pixel is determined, where the blurred pixel value is based on the set of input pixels and associated labels from the boundary map that correspond to the set of input pixels. The associated labels are used to reduce blurring in the output image of any of the one or more edges present in the set of input pixels.

20 Claims, 8 Drawing Sheets

EDGE-AWARE SMOOTHING IN IMAGES

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. Many users, however, would like to adjust their images to change or emphasize particular subjects or areas in photos. In some examples, users may want to de-emphasize particular portions or subjects depicted in an image, such as smoothing particular details in a photo.

SUMMARY

Implementations of the present application relate to edge-aware smoothing in images. In some implementations, a method includes determining a boundary map for an input image, where the boundary map associates one of multiple different labels to each pixel of the input image, and the labels indicate one or more edges in the input image. The method determines a set of input pixels of the input image eligible to influence an output pixel of an output image, the output pixel corresponding to a pixel of the input image. A blurred pixel value for the output pixel is determined, where the blurred pixel value is based on the set of input pixels and associated labels from the boundary map that correspond to the set of input pixels. The associated labels are used to reduce blurring in the output image of any of the one or more edges present in the set of input pixels.

Various implementations and examples of the method are described. For example, each label can indicate a color value change for the associated pixel with respect to one or more other pixels of the input image. Determining a blurred pixel value can include determining an associated label from the boundary map corresponding to each of the input pixel, determining one or more value contributions from the input pixels based on the corresponding label for the input pixel, and using one or more value contributions from the input pixels having the same label as the pixel in the input image corresponding to the output pixel. Determining a boundary map for the image can include performing a difference of Gaussians between a first blurred image and a second blurred image, where the first blurred image and the second blurred image are based on the input image. Each label of the boundary map can indicate a change in a color value of the pixel over a predetermined threshold, where the labels can include a label for indicating an increase in the color value, a label for indicating a decrease in the color value, and a label for indicating no change in the color value within the predetermined threshold.

The set of input pixels can be determined by a kernel including a plurality of kernel values, each kernel value associated with one of the input pixels aligned with the kernel value. For example, the value contribution can be determined based on a kernel that indicates the input pixels in the image, where examples of the kernel can include a box blur kernel or a Gaussian blur kernel. Determining one or more value contributions from the input pixels can include traversing the input pixels in the image in a direction from an origin pixel of the input image that corresponds to the output pixel, and, in response to a particular input pixel having a different label than the origin pixel, determining that the particular input pixel and all further input pixels past that particular input pixel in the direction have a reduced contribution to the blurred pixel value, thereby reducing blurring an edge indicated by the different label.

Determining a blurred pixel value for the output pixel can include value contributions from input pixels in only a single spatial dimension of the input image. Some implementations for the single spatial dimension can determine associated labels and value contributions from a set of output pixels in the output image in a different dimension in the input image than the input pixels, and determining a final blurred pixel value for a final output pixel of a second output image based on the value contribution from one or more of the output pixels. Some implementations can include traversing the input pixels in the input image in a direction from an origin pixel of the input image that corresponds to the output pixel, to the borders of the kernel. For each traversed input pixel, in response to the input pixel having a different label than the origin pixel, the method can determine that the input pixel and all input pixels past that input pixel in the direction have a reduced contribution to the blurred pixel value, thereby preserving an edge indicated by the different label. In response to the input pixel having the same label as the origin pixel, the method can determine a product of the associated kernel value and a color value of the input pixel, wherein the product is the value contribution for the input pixel.

In various implementations, the method can include accumulating multiple total contribution values, each total contribution value accumulated in a different buffer corresponding to one of the labels, wherein the contribution values from input pixels associated with the same label are accumulated in the same buffer. Each label can be associated with a plurality of buffers to accumulate total contribution values, wherein each buffer accumulates contribution values from contiguous input pixels having the same associated labels within the set of input pixels. The method can include obtaining blurred pixel values for output pixels corresponding to the input pixels, wherein an average of value contributions from a different set of input pixels is obtained for each blurred pixel value by using a moving average of the value contributions over the different sets of input pixels using a box filter.

A method can include, in some implementations, determining a boundary map for an input image, wherein the boundary map associates one of a plurality of different labels to each pixel of the input image, and wherein the labels indicate one or more edges in the input image. A kernel is provided including multiple kernel values corresponding to input pixels of the image and designating an origin pixel of the input image. For one or more input pixels designed by the kernel, the method determines an associated label from the boundary map corresponding to the input pixel, and determines a contribution from the input pixel based on the corresponding label of the boundary map compared to an associated label of the origin pixel. The contribution from the input pixel is reduced in response to the label indicating a presence of an edge of the one or more edges to cause a reduction of blurring of the edge in an output image. The method determines a blurred pixel value for an output pixel of the output image, where the output pixel corresponds to the origin pixel, and the blurred value is based on the contribution from each input pixel.

Various implementations and examples of the above method are described. For example, one or more input pixels designated by the kernel can be examined by traversing the input pixels from the origin pixel in a direction towards a boundary of the kernel, and in response to determining that a particular input pixel has a different label than the label of the origin pixel, the particular input pixel and all further input pixels past that particular input pixel in the direction are reduced in their contribution to the blurred pixel value. Each label can indicate a color value change for the associated pixel with respect to one or more other pixels of the input image. Determining the blurred pixel value for the output pixel can include value contributions from input pixels in only a single spatial dimension of the input image, for example.

In some implementations, a system can include a storage device and at least one processor accessing the storage device and operative to perform operations. The operations include determining a boundary map for an input image, where the boundary map associates one of multiple different labels to each pixel of the input image, and the labels indicate one or more edges in the input image. The operations also include determining a set of input pixels of the input image eligible to influence an output pixel of an output image, where the output pixel corresponds to a pixel of the input image. A blurred pixel value is determined for the output pixel, where the blurred pixel value is based on the set of input pixels and associated labels from the boundary map that correspond to the set of input pixels. The associated labels are used to reduce blurring in the output image of any the one or more edges present in the set of input pixels.

In some example implementations of the system, determining a blurred pixel value can include determining an associated label from the boundary map corresponding to each of the input pixels, and determining one or more value contributions from the input pixels based on the corresponding label for the input pixel. Determining the blurred pixel value for the output pixel can include using one or more value contributions from the input pixels having the same label as the pixel in the input image corresponding to the output pixel. One or more of pixels in the set of input pixels can be examined by traversing the one or more input pixels from the origin pixel in a direction away from the origin pixel, and in response to determining that a particular input pixel has a different label than the label of the origin pixel, the particular input pixel and all further input pixels past that particular input pixel in the direction can be reduced in their contribution to the blurred pixel value.

DETAILED DESCRIPTION

Figure 1:
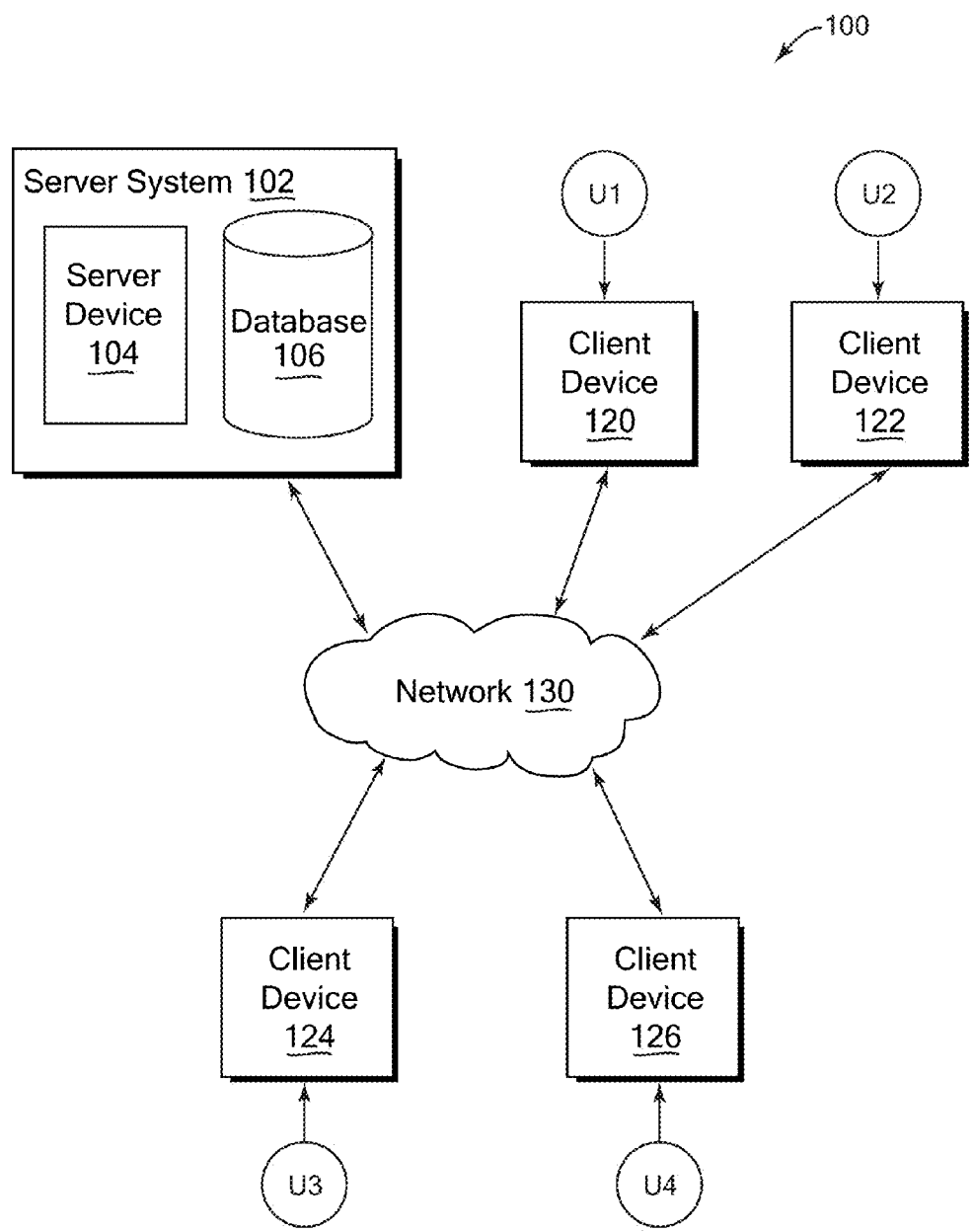
FIG. 1 is a block diagram of an example network environment which may be used for one or more implementations described herein.

One or more implementations described herein relate to smoothing for an image without affecting certain edges such as color boundaries in the image. A system can determine a boundary map for an input image, where the boundary map indicates edges in the input image, e.g., color value changes for pixels with respect to other pixels. The system can designate a set of input pixels of the input image eligible to influence an output pixel of an output image, and determine a blurred pixel value for the output pixel. The blurred pixel value is based on the set of input pixels and associated labels from the boundary map, where labels are used to reduce blurring in the output image of any of the one or more edges present in the set of input pixels. Implementations can allow automatic smoothing of various features of an image without significantly affecting features desired to retain sharp edges of higher contrast, and without a user having to manually perform such adjustments to the image.

In some implementations, the system obtains an input image and determines a boundary map for the input image. The boundary map associates a label to each pixel of the input image, where the labels indicates edges in the image, e.g., a value change in color for the associated pixel with respect to one or more pixels of the input image. In some implementations, a number of different labels can be assigned, such as three different labels, using thresholds to assign ranges of color change to the different labels. In some implementations, a difference of Gaussians can be used to obtain the boundary map, and various parameters can be set such that the boundary map indicates edges of a desired degree or size.

The system determines a set of input pixels of the input image eligible to influence an output pixel of an output image. The output pixel corresponds to a pixel of the input image. For example, a kernel can be used to define the set of input pixels, where an origin position of the kernel indicates an origin pixel to be blurred to create the output pixel. Various implementations can use one-dimensional or two-dimensional kernels, and various types of kernels can be used, such as a box blur kernel or a Gaussian blur kernel.

The system determines a blurred pixel value for the output pixel based on the set of input pixels and associated labels from the boundary map that correspond to the set of input pixels. In some implementations, the system examines each input pixel and its associated label from the boundary map, and determines value contributions from the input pixels based on the corresponding labels. Value contributions are used from the input pixels having the same label as an origin pixel in the input image corresponding to the output pixel. For example, input pixels can be traversed within the kernel in a direction away from the origin pixel, and their contributions used to blur the origin pixel if they have the same label as the origin pixel. If a different label is encountered, that input pixel and further input pixels past it are not used for the blur, or can have their contributions reduced, thus preserving edges and reducing blurring of those edges in the output image as indicated by the labels. Some implementations can use label bins associated with each label to accumulate pixel contributions from different label sections within the kernel and the input image, where contributions from pixel sections across edge are not used to determine the blurred value.

Described features can allow, in some implementations, blurring and smoothing for desired features in an image such as skin pores and other facial skin features, without blurring sharp, higher-contrast edges such as on glasses frames on a face. For example, edges as indicated by the boundary map are not traversed and pixels on such edges and on the other side of such edges do not influence the blur strongly enough, thus reducing smoothing of desired sharp edges in the output image. Some implementations provide efficient processing of pixels using blurring techniques in separable dimensions and/ or reduced operations in accumulating pixel contributions for the blurred values. In addition, these processes can be implemented automatically without user input to allow a user to avoid tedious manual manipulation and adjustment of an image to achieve desired smoothing.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In one example, users U1, U2, U3, and U4 may interact with each other via a social network service implemented on server system 102, where respective client devices 120, 122, 124, and 126 transmit communications and data to one or more server systems such as system 102, and the server system 102 provides appropriate data to the client devices such that each client device can receive shared content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat with other users of the service, etc. As used herein, the term "social networking service" can include a software and/or hardware system that facilitates user interactions, and can include a service implemented on a network system. In some implementations, a "user" can include one or more programs or virtual entities, as well as persons that interface with the system or network.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations can use any type of system and service. For example, users accessing any type of electronic device can make use of features described herein. Some implementations can provide features described herein on client or server systems disconnected from or intermittently connected to computer networks. In some examples, a client device having a display screen can display images and provide features and results as described herein that are viewable to a user.

Figure 2:
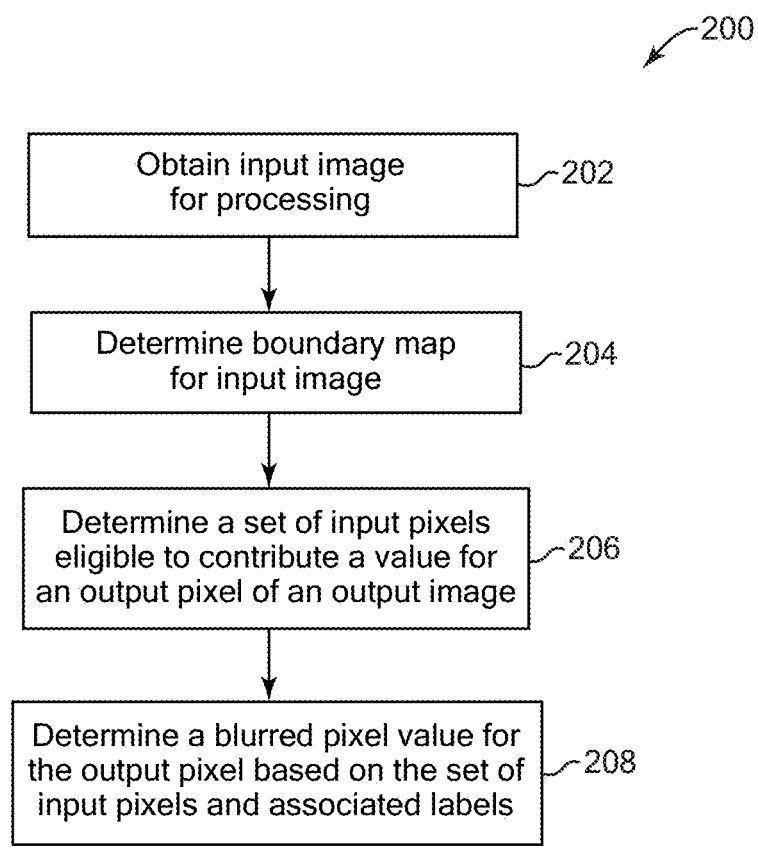
FIG. 2 is a flow diagram illustrating an example method for providing edge-aware smoothing in images, according to some implementations.

FIG. 2 is a flow diagram illustrating one example of a method 200 for providing edge-aware smoothing in images, according to some implementations. In some implementations, method 200 can be implemented, for example, on a server system 102 as shown in FIG. 1. In other implementations, some or all of the method 200 can be implemented on a system such as one or more client devices, or on both server and client systems. In described examples, the system includes one or more processors or processing circuitry, and one or more storage devices such as a database 106 or other storage. In some implementations, different components of one or more servers and/or clients can perform different blocks or other parts of the method 200. Method 200 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 200 can be performed as part of or component of an application running on the system, or as an application or software running in conjunction with other applications and operating system.

In some implementations, the method 200 can be initiated automatically by the system. For example, the method can be periodically performed, or performed based on a particular event such as one or more original images being newly uploaded to or accessible by the system, or a condition specified in custom preferences of one or more users of the system. Some implementations can initiate method 200 based on user input. A user may, for example, have selected the initiation of the method 200 from an interface such as a social networking interface or other graphical interface.

In block 202 of method 200, the method obtains an input image for processing. The image can be a digital image composed of multiple pixels, for example, and can be stored on one or more storage devices of the system or otherwise accessible to the system, such as a connected storage device, e.g., a local storage device or storage device connected over a network. In various implementations, the input image can be automatically selected by the method, e.g., as an image from an album or other collection of multiple images, such as an album provided local to a user's device or album provided remotely on a server, such as in an account of a user of a social networking system. In some implementations, the system can determine which image is obtained based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

In some cases or implementations, the entire input image can be processed by method 200 to smooth or blur pixels, e.g., all of the pixels of the input image. In other cases or implementations, one or more portions of the image can be processed while other portions are not. In some examples, face or skin portions of persons depicted in the input image can be processed by method 200, while background and other portions are excluded from processing or are processed by method 200 using one or more different parameters than the face or skin portions. For example, an image mask can be provided to method 200 indicating which portions are to be processed.

In block 204, the method determines a boundary map for the input image. The boundary map is a pixel map (e.g., bitmap) corresponding to the input image that indicates one or more edges or boundaries in the input image by associating one of multiple different labels to each pixel of the input image. In some implementations, these can be edges or boundaries of features of the image, such as depicted objects, persons, landscape sections, shapes, lines, etc., or can be edges or boundaries within such features, e.g., depicting texture, sub-features, etc. For example, a label indicates a value change for an associated pixel with respect to one or more pixels in the image, such as pixels adjacent to or near the associated pixel. In some implementations, the value change can be a color change having a magnitude over a predetermined threshold, which appears as a color edge in the input image. Color changes or discontinuities that happen quickly within a small area of pixels cause a higher-contrast, sharper edge to appear in the image, and such edges can appear in the boundary map with different labels. The blurring of the input image can be based on the labels so as to reduce the blurring of one or more edges, thus preserving the quality of the appearance of edges.

In some implementations, each pixel of the boundary map indicates whether the corresponding pixel in the input image changes in value (such as color) over a threshold amount with respect to one or more adjacent or near image pixels, e.g., indicate the slope or rate of change in color change (second derivative of color). In addition, the boundary map pixel can indicate the direction of the slope of the change, such as from a low to high value or high to low value. These indications of change are designated by a "label" of the boundary map pixel, such as a particular color of the boundary map pixel or other pixel characteristic. In one example, three different labels can be used, where a first label indicates a change in color over the threshold from low to high (a positive slope), a second label from high to low over the threshold (a negative slope), and a third label for no change in color within the threshold amount (a flat slope). In some examples described herein, a white color in the boundary map indicates a positive slope, a black color indicates a negative slope, and a gray color indicates a flat slope. Other implementations can use a different number of labels, such as one label to indicate a positive or negative slope, or additional labels for multiple thresholds for different magnitudes of changes in color. Other implementations can use different colors or other pixel characteristics for indicating labels.

A boundary map can be determined in different ways. In some example implementations, the boundary map can be determined by taking a difference of Gaussians between two blurred versions of the input image. For example, a Gaussian blur can be applied to the input image to obtain a first blurred image, and a different Gaussian blur can be applied to the input image to obtain a second blurred image. The first and second blurred images are subtracted from each other to obtain the difference of Gaussians. The difference of Gaussians acts as a bandpass filter that indicates high-frequency edges in an image, and can be customized to provide image features of a particular sharpness, thickness, size, etc. In some implementations, the individual color channels in a blurred image are subtracted from the corresponding color channels in the other blurred image. For example, the red channel from the first blurred image is subtracted from the red channel of the second blurred image, and a similar difference is obtained for green and blue channels.

The difference of Gaussians from each color channel are averaged together to provide the pixel labels for the boundary map. For example, the resulting differences in each color channel can be clamped to particular values based on predetermined thresholds and the number of different labels used in the boundary map. In one non-limiting example, when using three labels and RGB color channels, if the difference in red channels for a pixel in the blurred images is above a high threshold, it can be clamped to 1, between thresholds then clamped to 0, and below a low threshold then clamped to −1. Other values can be used for such clamping in other implementations. The three channel differences are then averaged together and the averaged result is clamped to three particular values for a boundary map pixel indicating the label, such as 0 (black), 0.5 (gray), and 1 (white). Performed for each pixel, this results in a single boundary map that includes the difference information from the three color channels.

A wide range of different parameters can be used in the Gaussian blurs of the two blurred images to achieve a desired level of detail for edges shown in the boundary map. For example, the sigma ($\sigma$) variable in each of the blurs, and/or the blur radii of the two Gaussian blurs, can be set to different values. Furthermore, such parameters and/or thresholds for labels can be changed to cause the different labels to incorporate features of the input image into particular labels. For example, a threshold can be increased to allow more features to fall within the flat (gray) label, causing higher-contrast edges to be indicated in the boundary map as black or white labels. The parameters (such as blur radii) can be changed to cause the positive slope and negative slope labels to include more pixels, such as having a greater number of pixels in the labels indicating edges to provide thicker-appearing edges.

Furthermore, these parameters can be determined or adjusted based on measured features within the image. For example, in a face smoothing application, only certain larger or high-contrast facial features of a face depicted in the image may be desired to be indicated in the boundary map, where those features are desired to be smoothed. The approximate size of that face can be estimated, e.g., based on spatial landmarks (eyes, mouth, etc.), distances, and/or estimated face angles received from a facial recognizer, where in some implementations the face and head size can be estimated based on accessing data describing average proportions of faces with respect to distances between landmarks in the faces. After the face size is estimated, the approximate size of larger or high-contrast facial features can then be estimated based on the face size. The parameters can be set accordingly to only indicate the larger or high-contrast features of particular thickness or size (e.g., glasses frames, etc.) in the boundary map, while smaller or lower-contrast features (such as skin pores or smaller wrinkles) will not be indicated by the white or black labels in the boundary map. This allows a user to set parameters to preserve particular strengths or types of edges from the final blurring operation.

In other implementations, other techniques can be used to determine the boundary map in block 204. For example, a Laplacian of Gaussian (LoG) technique can be used (e.g., a Difference of Gaussians technique as described above can be an approximation of a Laplacian of Gaussian technique). A LoG filter having a zero response at edge locations, a positive response on one side of edges, and a negative response on the other side of edges can be used, and can thus provide the boundary map that identifies edges in the image and distinguishes one side of an edge from another, resulting in a tri-level image with labels for the edge, positive side of the edge, and negative side of the edge in the boundary map. Some examples of the use of a LoG filter for such edge detection are described in U.S. Pat. No. 7,813,582 of Chaudhury et al., which is incorporated herein by reference in its entirety.

Some implementations can also analyze the boundary map to adjust it in particular ways. For example, if particular patterns of labels are shown in the map, these patterns may be able to be simplified by combining labels or removing labels, thus potentially decreasing the number of operations made during smoothing. In one example using the gray, white, and black labels described above, if a pattern of boundary map pixels having a pattern of white, then gray, then black (or the reverse) is found within a short threshold pixel distance, then the middle gray-labelled region may be able to be removed and/or changed to the surrounding white or black labels since the gray-labelled input pixels are likely to be close in color to the white- and black-labelled input pixels, and thus are not likely to need independent smoothing.

Some examples of boundary maps are described below with reference to FIGS. 7 and 9.

In block 206, the method determines a set of input pixels that are eligible to contribute a value for an output pixel of an output image. The output image will be the resulting blurred or smoothed image based on blurring the input pixels of input image, and the output image is made up of output pixels that are blurred versions of input pixels. In some implementations, to determine the set of input pixels that are eligible to contribute to an output pixel, a kernel is used. A kernel (e.g., convolution matrix) is a matrix that is convolved with input pixels to obtain blurred output pixels. The kernel includes kernel values that are chosen based on the type of processing desired for the image. As described below in various implementations, the kernel can be a one-dimensional kernel having a row or column of kernel values, or can be a two-dimensional kernel having a grid of kernel values. In some examples, a box blur operation can be performed to obtain blurring, in which the kernel values are all equal to 1. In other implementations, a Gaussian blur can be performed, in which the kernel values vary, e.g., higher values in the middle and lower values at the edges of the kernel to provide a Gaussian distribution.

A kernel can be placed such that one or more kernel values are aligned with corresponding input pixels of the input image. The kernel is placed with respect to an origin pixel of the input image, where the origin pixel value is to be replaced with a blurred value that is determined based on the contributions of the other input pixels at kernel positions. In some implementations, the origin pixel is the input pixel aligned with the center of the kernel, and the input pixels at the other positions of the kernel contribute to the blur value that will replace the origin pixel with an output pixel in the output image. Thus, in block 206 using a kernel implementation, the set of input pixels eligible to contribute a value for the output pixel can be those input pixels at locations corresponding to kernel positions (except for the origin pixel position). Other implementations can use a different pixel as the origin pixel, e.g., at a different kernel position or outside the kernel.

In block 208, the method determines a blurred pixel value for the output pixel based on the set of input pixels and their associated labels. In general, the blurred pixel value is a weighted average of particular pixels near the pixel in the input image that will be blurred and which corresponds to the output pixel. In various implementations such as those described below, the labels of the input pixels as determined from the boundary map are used to determine how the input pixels contribute to the blurring of the output pixel value. For example, edges as indicated in the boundary map may cause contributions from some nearby input pixels to be reduced or eliminated. This allows desired edges to be preserved in the output image and reduces undesired blurring across such edges.

After the output pixel value is determined in block 208, the method can determine additional output pixel values in a similar way by, for example, moving the kernel across the input image and determining a blurred pixel value at each output pixel position. Some examples of such implementations are described below.

Figure 3:
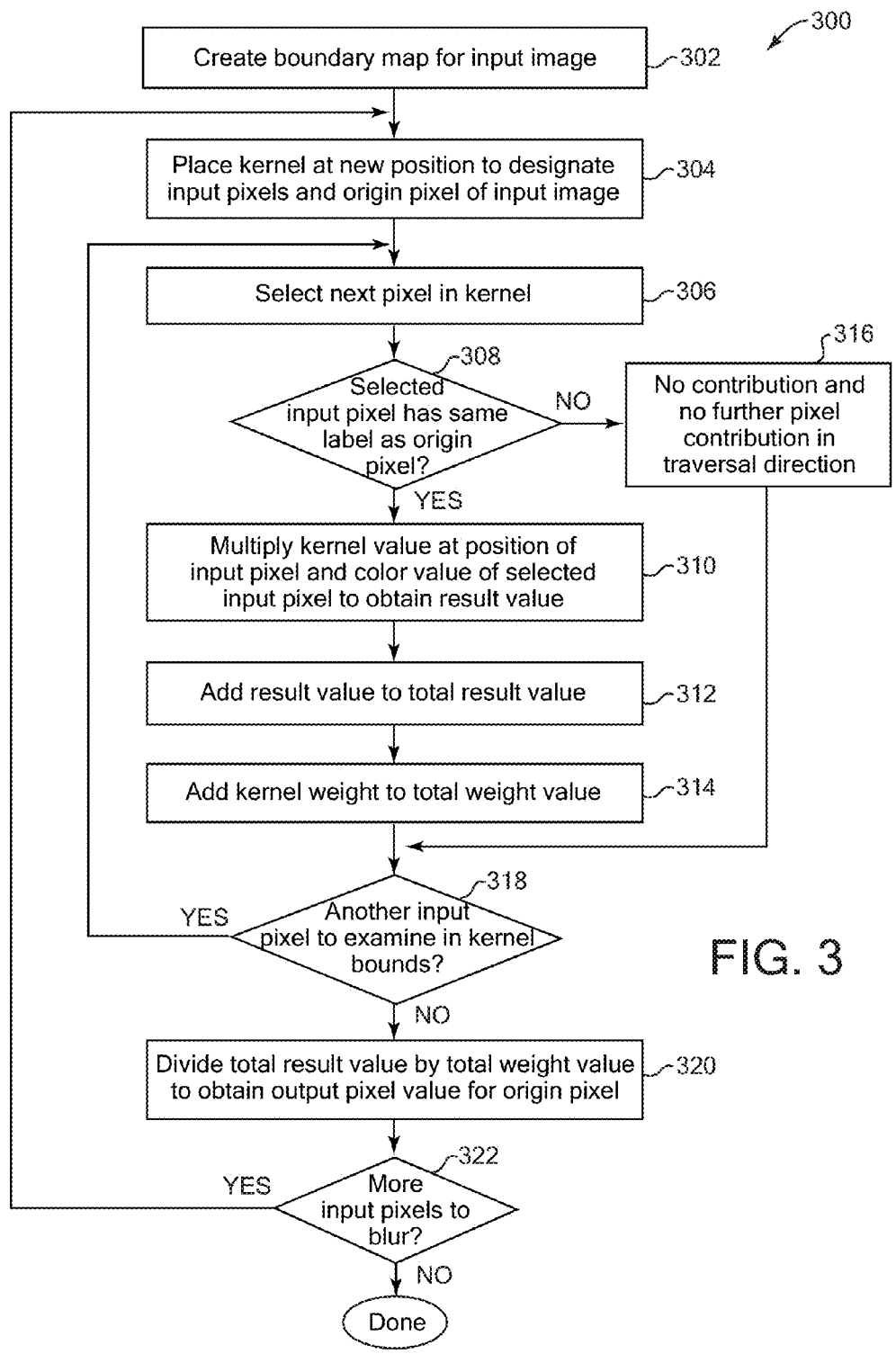
FIG. 3 is a flow diagram illustrating another example method for providing edge-aware smoothing in images, according to some implementations.

FIG. 3 is a flow diagram illustrating another example method 300 for providing edge-aware smoothing in images, according to some implementations. Method 300 can be implemented by a system such as a server and/or client device as described above.

In block 302, the method creates a boundary map for the input image. This can be implemented similarly as described above for block 204. In block 304, the method places the kernel at a new position to designate the eligible input pixels of the input image for contributing to a blurred value for an origin pixel of the input image. In some examples, the origin pixel position is at the center of the kernel. Some implementations can use a one-dimensional kernel. For example, a horizontal kernel can be used that includes a single row of kernel values and which is positioned such that the center pixel is at the center of the kernel. In some implementations, the kernel is moved horizontally to find blurred pixel values for output pixels corresponding to a horizontal row of input pixels. Similarly, a vertically-aligned kernel can be vertically moved along a vertical column of input pixels. In other implementations, a two-dimensional kernel can be used that includes multiple rows and columns of kernel values, where the origin position can be at the center of the kernel. In some implementations, the first position of the kernel can be such that only a portion of the kernel values are aligned with input pixels and the rest of the kernel values (including the origin position of the kernel) are not yet aligned with input pixels, e.g., are off the edge of the input image. As the kernel is moved, the entire kernel eventually is aligned over input pixels. In the examples that follow, it is assumed that the kernel has been sufficiently moved to align the origin kernel position over an input pixel.

In block 306, the method selects the next input pixel aligned with the kernel. This can be the next aligned input pixel aligned that has not yet been examined for its contribution. In one example using a one-dimensional kernel, the first examined input pixel can be the origin pixel, followed by traversing the pixels to a pixel position next to the origin position, e.g., in the direction of movement of the kernel. The next input pixel examined can be adjacent to that pixel, e.g., in the direction of movement of the kernel, until the input pixel at the edge of the kernel is reached. The input pixels on the opposite side of the origin pixel can be similarly examined. In a two-dimensional kernel, the input pixels in the kernel can be traversed in one direction out from the center pixel, then another, etc., and/or in a radial direction relative to the center.

In block 308, the method checks whether the selected input pixel has the same label as the origin pixel. If so, in block 310, the method multiplies the kernel value at the position of the selected input pixel and the color value of the selected input pixel to obtain a result value. Since the selected input pixel has the same label as the origin pixel, there is no edge in the image, and this input pixel's result value is used as a contribution used to later determine the blurred value. In block 312, the result value is added to an accumulated total result value stored in a buffer. In block 314, the method adds the kernel weight value to a total weight value, where the kernel weight value is the kernel value (or weight) at the position of the selected input pixel. In some examples, a Gaussian blur can be used where the kernel values vary from higher values at the middle of the kernel to the lowest values at the outer borders of the kernel. In some other implementations, a box blur may be used where the kernel includes only 1 values as kernel values. In such a case, the weight of any kernel value is 1 and the total weight value is a count of the number of input pixels that have contributed to the total result value. The method then continues to block 318, described below.

Referring back to block 308, if the label of the selected input pixel is different than the label of the origin pixel, then in block 316 the method does not determine any result value for contribution by the selected input pixel. Furthermore, no further pixel contributions are to be made past the selected input pixel in the current direction of traversal of input pixels for their contributions. The method then continues to block 318, described below. For example, if using a one-dimensional kernel and traversing pixels from the center origin pixel in a direction toward the kernel border, the remaining pixels toward the border are excluded from contribution and their result values need not be determined. This causes input pixels on an edge and on the other side of an edge to no longer contribute to the blur value for an output pixel, thus preserving edges in the output image.

In other implementations, input pixels having a different label than the origin pixel can contribute their values, but in a reduced amount compared to input pixels having the same label as the origin pixel. For example, the pixel value (e.g., color values) of the selected input pixel can be scaled down by a predetermined scale factor, and then multiplied by the weight of the kernel as in block 310 to obtain the result value, and/or the result value can be scaled down. In some examples, predetermined scale factor can be 0.5, e.g., half the contribution as a same-labelled pixel. Thus, input pixels having a different label may still contribute to the origin pixel, but by a much lower amount, thus preserving higher-contrast edge information. In some implementations, the further that input pixels are away from the origin pixel on the other side of a different-label edge, the lower their result value can be scaled. In some examples, each successive label transition can again multiply the scale factor to the pixel value or result value. For example, the first different label encountered from the origin pixel can provide a scaling factor of 0.5 to all pixels of the different label, the next label transition to a different label in the same direction can cause all pixels of that label to have a scaling factor of 0.25, and so on.

In some implementations, contributions from input pixels having different labels can be scaled down based on which labels are adjacent, e.g., where different labels having less color change between them can contribute to each other in a reduced way. In one example, a gray label can represent a more flat, less-changing color with respect to nearby pixels, and white and black pixels represent more steep changes in positive and negative directions, respectively. A gray pixel adjacent to a pixel having a black or white label can have its result value scaled down and added to the total result value for an origin pixel having a white or black label. Similarly, a pixel having a black or white label can contribute a scaled-down value for a gray-labelled origin pixel. However, a white-labelled input pixel would not contribute for a black-labelled origin pixel, nor a black-labelled input pixel for a white-labelled origin pixel. This can allow some blending between flat and more-steeply-sloped color areas in the image, but prevents or reduces blending between labels indicating a greater color change.

In block 318, the method checks whether there is another input pixel to examine within kernel bounds that has not yet been examined. If so, the process returns to block 306 to select the next unexamined input pixel within the kernel and determine its contributing result value in later blocks, if appropriate. If there are no other unexamined input pixels within the kernel, then in block 320 the method divides the total result value by the total weight value to obtain an output pixel value at the position of the origin pixel. This is the blurred value for that pixel position as contributed to by appropriate input pixels in the kernel as determined above. This allows a blurred value for an origin pixel to be determined based on nearby pixels within the kernel that have the same label as the origin pixel and thus do not have a drastic color change from the origin pixel's color.

In block 322, the method checks whether there are additional input pixels of the input image to blur into output pixels for the output image. If not, then the method ends. If there are additional input pixels to blur, then the method returns to block 304 to position the kernel at a new pixel position of the input image. For example, the origin pixel position of the kernel can be moved to the next horizontal or vertical input pixel in the input image. The method then examines input pixels within the kernel to accumulate appropriate contributing result values, such that a blur value for the new origin pixel can be determined as described above.

Some implementations can use kernels having one spatial dimension, e.g., a single row or column of kernel values. In some of these implementations, the input pixels can be blurred in one spatial dimension, and then the output image from the first blurring is blurred in a different spatial dimension for a second blurring to achieve a final blurred output image. For example, a horizontal kernel having a height of 1 pixel can be moved horizontally over each input pixel row, blurring each pixel based on horizontal pixel contributions. Then a vertical kernel having a width of 1 pixel can be moved vertically over each pixel column of the blurred output result of the horizontal kernel blurring. Such separate horizontal and vertical blur processing can have an advantage in efficiency since less multiply and additional operations are typically needed to achieve the final blurred image compared to using a two-dimensional kernel. In some implementations, this horizontal and vertical pass over all the pixels can be repeated one or more times to reduce any artifacts such as streaks of color in the resulting blurred image. For example, all horizontal passes can be performed, and then all vertical passes. Alternatively, a set of horizontal and vertical passes can be repeated. Some implementations can reduce the size of the kernel for each subsequent pass in a particular dimension (e.g., halving the kernel size). In some examples, for each additional iteration of horizontal and vertical blurring using a Gaussian blur, the standard deviation (σ) term of the blur can be reduced, e.g., from 3 standard deviations initially, to two, then one. This can allow gaps in color between adjacent pixels that are not indicated in the boundary map to be more effectively smoothed with later iterations. Some implementations can determine a new boundary map between each blurred output image.

Figure 4:
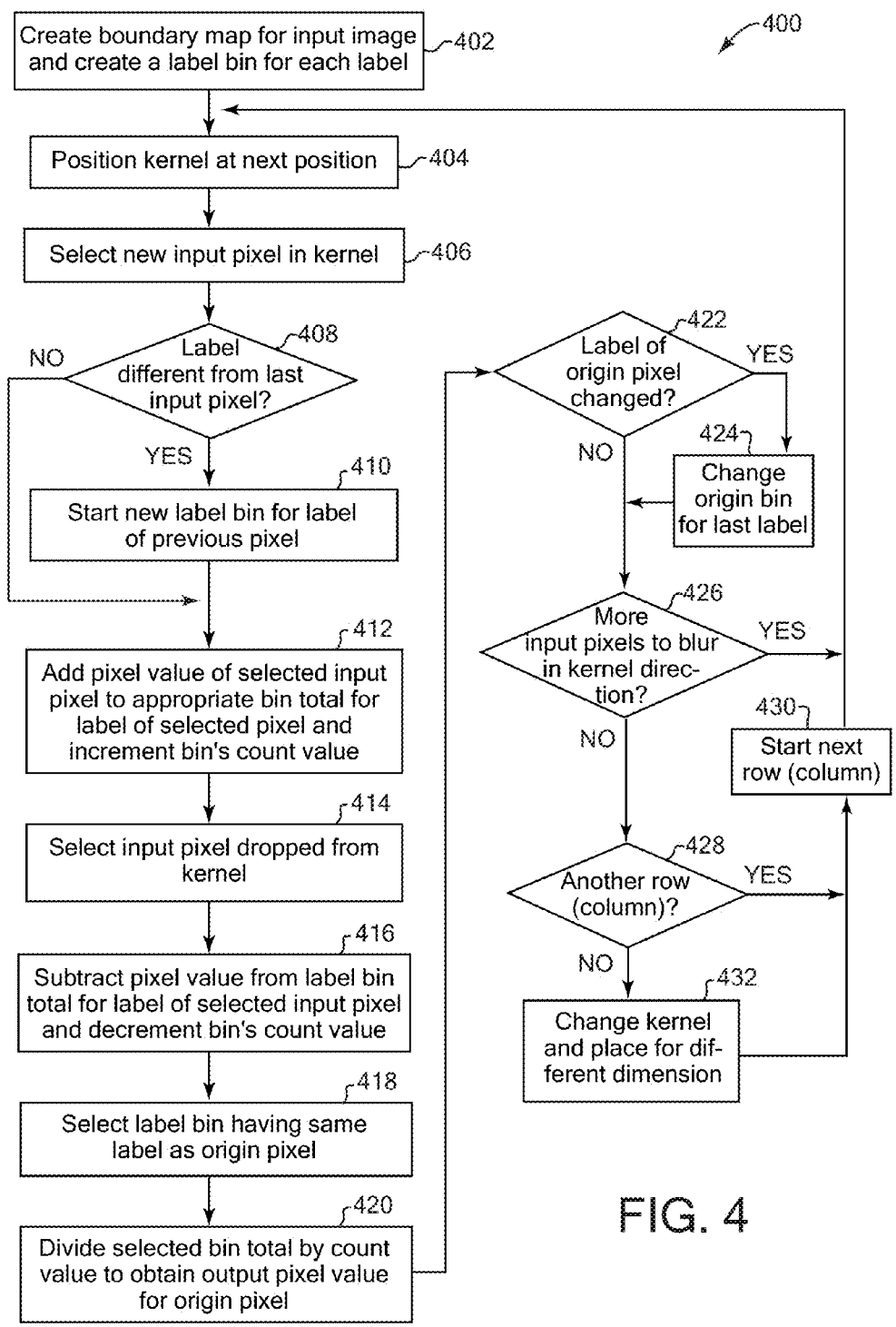
FIG. 4 is a flow diagram illustrating another example method for providing edge-aware smoothing in images, according to some implementations.

FIG. 4 is a flow diagram illustrating another implementation for an example method 400 for providing edge-aware smoothing in images. Method 400 can be implemented by a system such as a server and/or client device as described above. In some implementations, method 400 can include efficiencies such as the ability to maintain a running average of pixel contributions so as to not determine pixel contributions for all eligible pixels in the kernel at each new origin pixel. In the example of method 400, a one-dimensional kernel is used and label bins are created for each label of the boundary map.

In block 402, a boundary map is created from an input image similarly as described above for FIGS. 2 and 3. In addition, a set of bins can be allocated in memory for each label in the boundary map. For example, if three labels are designated in the boundary map, such as white (positive sloping change in color), black (negative sloping change in color), and gray (approximately no deviation in slope of color change), then a different label bin can be allocated for each of these labels. The label bin is a storage buffer or area in memory accessible to the system, storing a total value related to the blurring process. In some implementations, the number of bins associated with each label can be equal to the number of possible transitions between labels that can occur within the kernel. Thus, when using a one-dimensional kernel, this number is equal to the pixel length of the kernel being used divided by two (rounded up). For example, if a kernel size of 1×7 is being used, then 4 bins can be allocated for each label. In some implementations, the bins can be accessed by an index into an array of the bins, or by another pointer or data structure. Each label bin can also be associated with a total weight value, which in this example is a count value indicating the number of pixel contributions to the associated bin.

In block 404, the method positions the kernel at a next position of the input image to designate the eligible input pixels for contributing to the blurred value for the origin pixel. In this example, a one-dimensional kernel is used to blur the input pixels in one dimension such as horizontally or vertically. Thus the next position can be the next input pixel over from the last position of the kernel in a particular direction of the dimension being processed. The origin pixel is at the center of the kernel in this example. In some examples, the kernel can be started off the edge of the input image and then moved such that the first position of the kernel is over the first edge pixel of the input image. Later positions of the kernel eventually cause the origin pixel to be aligned with an input pixel of the input image, and further positions causes all positions of the kernel to be aligned with input pixels.

In this example, a box filter is used to perform a box blur, in which the kernel has weights that are all equivalent. This allows a running average to be kept during the movement of the kernel over new origin pixel positions, such that only new and dropped pixel contributions need be processed and the other input pixel contributions need not be newly computed for each new position of the kernel. Other implementations can use different types of blurs, such as Gaussian blur kernels.

In block 406, the method selects the new input pixel now included in the kernel. For example, the kernel was moved to a new position that is one pixel over from its last position, such that one new input pixel is newly covered by the front position of the kernel and the opposite, tail end of the kernel has dropped and left behind the input pixel formerly at that end. In block 408, the method checks whether the label of the selected new input pixel is different from the label of the last examined (adjacent) input pixel previously at the front position of the kernel. If the label is not different, the process continues to block 414, described below. If the label is different, then in block 410 the method starts or makes active a new label bin for the label of the previously examined input pixel. This causes the previously-used label bin for that label to be completed and no more pixels can contribute to it because an edge has been encountered as indicated by the change in labels. The new label bin for that label will be used if another pixel having that same label is later examined for contribution, e.g., on the other side of the boundary. Since such later pixels are separated from the previous section of same-labelled pixels by the boundary, they contribute to their own new label bin. Thus, a section of contiguous input pixels having the same label contribute to the same particular label bin, and pixels having the same label that are separated by an edge or boundary contribute to different bins of that label. In some implementations, the new label bin can be made active by incrementing a contribution index into the array of label bins, such that any new pixel contributions of that label will be added to a total value in the label bin pointed to by the contribution index. In addition, the method can record this label transition and/or the pixel location where this label transition occurred. For example, the coordinates or count of the selected pixel and/or the last examined pixel can be recorded.

In block 412, the method adds the pixel value of the selected input pixel to the total value in the appropriate label bin for the label of the selected input pixel. Since there are multiple bins for each label, the appropriate bin corresponds to the contiguous section of input pixels having this label. This appropriate label bin is the newest label bin for the label that was started or made active in block 410 in this or a previous iteration of the method, e.g., a bin to which a contribution index is pointing. Since the kernel value (weight) is 1 for all positions of the kernel, the pixel value need not be multiplied by a kernel weight and the pixel value itself can be added to the total value in that bin. In addition, that bin's count value is incremented by one to count the pixel contribution made, since the weight of the kernel is 1. In some implementations, each label bin stores the total values for each color channel (e.g., red, green, and blue) in sub-bins, such that the selected pixel value in each color channel is added to the appropriate channel's sub-bin in the label bin.

Some implementations can adjust the contribution pixel value of the selected input pixel based on a pixel distance of the selected pixel from the origin pixel. Since the example implementation of FIG. 4 uses a box filter having all kernel values be 1, distance from the origin pixel is not factored into pixel contributions unless added explicitly. For example, a distance scaling factor multiplied by the pixel value can cause input pixels having the same label as the origin pixel to contribute a reduced pixel value to the total value, where the distance scaling factor is further reduced as the distance between origin pixel and selected pixel is increased. This causes input pixels further away to contribute less. In some implementations, the distance scaling factor can be reduced linearly with distance, while in other implementations the scaling factor can be reduced exponentially or based on some other function, e.g., pixel values may not be scaled down by much until after a particular distance, after which pixel values are scaled down by much more.

In block 414, the method selects the input pixel just dropped from the kernel, e.g., the input pixel that was formerly at the last position of the kernel and is now adjacent to the tailing end of the kernel. The contribution from this pixel is no longer relevant at the current kernel position and so should be removed from consideration. In block 416 the method subtracts the pixel value of the selected (dropped) input pixel from the total value in the label bin corresponding to the selected input pixel (which can be subtraction from independent color channels similarly as described above). In addition, the count value for this label bin is decremented to update the amount of pixels contributing to that bin. It should be noted that blocks 414 and 416 may not need to be performed if the label bin corresponding to the dropped pixel will no longer be used and/or has been deleted (e.g., in block 424), e.g., after the origin pixel has moved past the label section of the dropped pixel.

In block 418, the method selects the label bin having the same label as the origin pixel. Since there are multiple bins per label, the appropriate label bin is selected that holds the total value relevant to the origin pixel, e.g., the total value of contributions from input pixels that are in the same label section as the origin pixel and not separated from origin pixels by any edge. In some implementations, the appropriate label bin is pointed to by an origin index or pointer into the array of bins for this label. In some implementations, the appropriate label bin can be determined based on the recorded label transitions and/or their locations. For example, the location of the origin pixel can be compared to the recorded locations of label transitions to find the nearest transition in the direction of kernel movement having the same label as the origin pixel, and the number of transitions up to this location is determined. That number can be an origin index into the array of bins for that label to find the appropriate bin for the origin pixel. In other implementations, the appropriate label bin can be the first available label bin for that label, if any bins previously used were deleted after their total values were used to blur previous origin pixels.

In block 420, the total value from the selected label bin (which is the contribution of the input pixels having the same label as the origin pixel) is divided by the count value for that bin to obtain the output pixel value for the origin pixel. Similarly as described above, in some implementations this division can be performed independently for each color channel value.

In some implementations, the blurred output pixel value can not only be based on the input pixels having the same label as described above for block 420, but also can be based on (reduced) contributions from other input pixels having different labels. Similarly as described above for FIG. 3, pixels for the next different label section after the origin pixel's label can have the total value from their label bin be scaled down and then added to the total value from the origin pixel's bin. In some implementations, the scaling can use a predetermined label scaling factor, such as 0.5, where each successive different label pixel section has another scaling factor applied to further reduce the contribution from input pixels in that section, similarly as described above for FIG. 3. In some implementations, pixels within each label section can have their contributions further reduced by a distance scaling factor based on distance from the origin pixel, as described above.

In block 422, the method checks whether the label of the current origin pixel has changed since the last origin pixel, e.g., an edge has been encountered by the current origin pixel. If not, the process continues to block 426, described below. If the label of the origin pixel has changed, then in block 424 the method changes the origin bin for the last label to the next bin of that label. For example, an origin index into the bins for that label can be incremented to point to the next bin. In some implementations, the bin from which the last origin pixel was determined is cleared or deleted since it is no longer needed, and the later bins for that label are associated with any later contiguous pixel sections of that label occurring after one or more boundaries.

In block 426, the method checks whether there are any more input pixels to blur in the direction of kernel movement. If so, the method returns to block 404 to position the kernel at the next position in the current pixel row (or column), and the method repeats a similar process to blur the origin pixel at that position and create a blurred output pixel. If at block 426 there are no more input pixels to blur in the kernel direction, then in block 428 the method checks if there is another row (or column) to process in the same dimension as the row (or column) just processed, e.g., the next row down or the next column to the right. If so, then in block 430 the kernel is positioned to the beginning of the next row or column, and the method returns to block 404 to start blurring the pixels of that row or column.

If at block 428 there are no further rows (or columns) to process in the same dimension, then in block 432 the method changes the kernel and places the kernel for movement and processing in a different dimension of the output image. For example, if the previous blurring were performed in the horizontal dimension for each row of the input image, then the kernel is changed to a vertically-oriented one-dimensional kernel and the columns of an input image are processed in the vertical direction. The input image used for this second blurring process is the output image resulting from the previous blurring process. This causes the pixels of the original input image to have two successive blurs, one in each dimension. This processing equates to performing a single blur using a two-dimensional kernel, and has a reduced amount of processing operations. In some implementations, a new boundary map can be determined for the output image of the first blurring process similarly as described above, and this new boundary map can be used for the second blurring process.

It should be noted that the blocks described in the methods of FIGS. 2, 3 and 4 can be performed in a different order than shown and/or simultaneously (partially or completely) with other blocks, where appropriate. For example, the check for whether the origin position of the kernel has changed labels in block 422 can alternatively be performed in the previous iteration as to whether the upcoming origin position changes labels relative to the current origin position. In some implementations, blocks can occur multiple times, in a different order, and/or at different times in the methods. In some implementations, the methods 200, 300 and/or 400 can be implemented, for example, on a server system 102 as shown in FIG. 1. In some implementations, one or more client devices can perform one or more blocks instead of or in addition to a server system performing those blocks.

Figure 5:
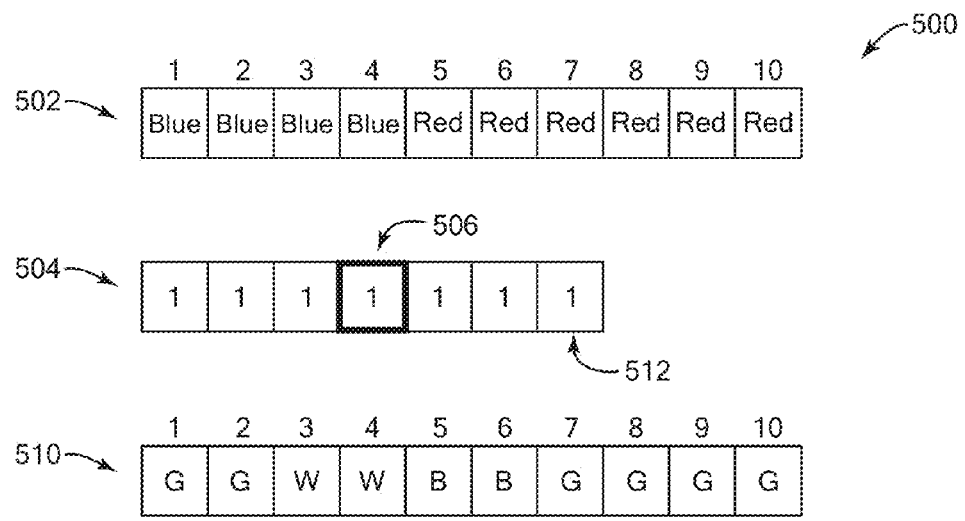
FIG. 5 is a diagrammatic illustration of an example of smoothing image pixels according to the method of FIG. 4.

FIG. 5 is a diagrammatic illustration of an example 500 of smoothing image pixels according to the method 400 of FIG. 4. A row of input pixels 502 is shown, which can be a portion of a full row of input pixels in an input image. In this example, ten input pixels are shown numbered consecutively starting from input pixel 1, where the first four pixels in the row are the color blue (e.g., RGB values of 0, 0, 255) and the next six input pixels in the row are the color red (e.g., RGB values of 255, 0, 0) (e.g., a color "value" as referred to herein can include the three color channel values). A one-dimensional kernel 504 is shown having dimensions of 1×7, and having an origin position 506 at the center of the kernel that indicates the origin pixel of the input image. The kernel values are all 1 to provide a box blur for the blur method.

A boundary map 510 is also shown, which has been derived from the row of input pixels 502. In this example, the boundary map pixels are numbered as their corresponding input pixels and are labelled with three different labels: gray (G) indicating a zero or flat color change (within a threshold), white (W) indicating a positive slope or change in color (over the threshold amount), and black (B) indicating a negative slope or change in color (over the threshold amount). Thus, the boundary map pixels 1 and 2 are labelled gray because the blue input pixels 1 and 2 have no color change with respect to their adjacent pixels. The boundary map pixels 3 and 4 are labelled white because of a positive threshold amount of change in color from blue to red between input pixels 4 and 5. Pixel 3 is labelled white even though it is not directly adjacent to red pixel 5 because of parameters set in the boundary map creation process, which caused a wider section of input pixels to be labelled as having a positive slope. The boundary map pixels 5 and 6 are labelled black because of a negative change in color on the other side of the color edge between pixels 4 and 5, and the boundary map pixels 7-10 are labelled gray because there are no further color changes.

Each of the labels of the boundary map 510 is associated with a number of label bins equal to the size of the kernel divided by two, rounded up, which in this case is four. This is the number of possible different contiguous label sections that can be included within the kernel. Thus, for labels Gray, White, and Black, each label has four label bins G1-G4, W1-W4, or B1-B4 and a count value associated with each bin. Each of the label bins can be composed of a number of sub-bins equal to the number of color channels, such as a red sub-bin, green sub-bin, and blue sub-bin for storing the RGB color channel values.

When processing the input pixels to determine blurred values for use as output pixels, the kernel in this example can be moved horizontally, left to right along each row of input pixels in the input image. For example, kernel 504 can be started on the left side of the row 502 such that the rightmost front kernel value 512 is aligned over pixel 1 of the row 502. This causes a contribution of the pixel value for input pixel 1 to the first label bin G1 for the Gray label, which is (0, 0, 255) RGB values for the blue color of pixel 1, and the count for label bin G1 is incremented. No determination of origin pixel blur value is determined since the origin position 506 of the kernel is not yet aligned over an input pixel in the row 502. The processing continues similarly at the next position of the kernel, where the new pixel 2 has its blue color values (0, 0, 255) added to the total values in the G1 bin, resulting in values of (0, 0, 512) in the G1 bin and a count of 2.

The kernel is then moved another pixel position to the right such that the front value 512 of kernel 504 is aligned over new blue input pixel 3. The label of pixel 3 is white and so the blue value (0,0,255) is added to the white label bin W1 and its count is incremented. Furthermore, since a label transition has occurred from gray to white, a new contribution label bin for gray is started, G2. The next gray-labelled pixel that is examined will contribute to bin G2, and bin G1 is completed with no further contributions because of the boundary indicated by the white label for pixel 3. At the next kernel position, pixel 4 similarly adds a blue value to the bin W1 and its count is incremented. In addition, the origin pixel position 506 of the kernel is now over input pixel 1, such that a blurred value is determined for pixel 1. Pixel 1 has a label of gray, and the gray origin index is still pointing to the first bin G1 which is therefore used. The total value in G1 (0,0,512) is divided by the count, 2, to achieve the resulting blurred value (0,0,255) for the output pixel 1 that corresponds to input pixel 1.

At the next kernel position, new input pixel 5 adds a red value (255,0,0) to the label bin B1 for its black label and its count is incremented. Furthermore, since a label transition has occurred from white to black, a new label bin for white is started, W2, which will receive the next contribution from a white-labelled pixel. In addition, the origin position of the kernel is aligned with pixel 2 and the blurred value is determined as the total value in bin G1 divided by the count, similarly as for pixel 1. At the next kernel position, new input pixel 6 adds a red value to the bin B1 and its count is incremented. The kernel origin position is aligned with pixel 3 and the blurred value is the total value in bin W1 divided by the count, which results in a blurred value similar as for pixels 1 and 2. In addition, since the kernel origin position has encountered a transition in labels from gray to white, the gray origin index is incremented to the next bin for gray, which is bin G2. This indicates that the bin G1 is no longer used for later origin pixels since it represents pixels across a boundary, and bin G1 can be deleted or cleared in some implementations.

At the next kernel position, new pixel 7 adds a red value to the label bin G2 for its gray label and its count is incremented. A label transition has occurred from black to gray at the front kernel position 512 so a new label bin for black is started, B2, which will receive the next contribution from a black-labelled pixel. The kernel origin position is aligned with pixel 4 and the blurred value is the total value in bin W1 divided by the count, similarly as for pixel 3.

At the next kernel position, new pixel 8 adds a red value to the label bin G2 for its gray label and its count is incremented. In addition, the kernel has dropped pixel 1 which will no longer contribute to the origin pixel, and thus its contribution should be subtracted from its associated label bin and that bin's count decremented. In this case, however, the associated label bin is G1 which is no longer used, so no subtraction need be performed. The kernel origin position is aligned with pixel 5 and the blurred value is the total value in bin W1 divided by the count, similarly as for pixel 3. In addition, the origin position has encountered a transition in labels from white to black, so the white origin index is incremented to the next bin for white, which is bin W2. Bin W1 will no longer be used and can be deleted or cleared in some implementations.

Additional new pixels are similarly added to the appropriate bins, where new bins are started after a label transition has occurred and existing older bins are set aside or deleted after the kernel origin position moves beyond the associated label section.

Figure 6:
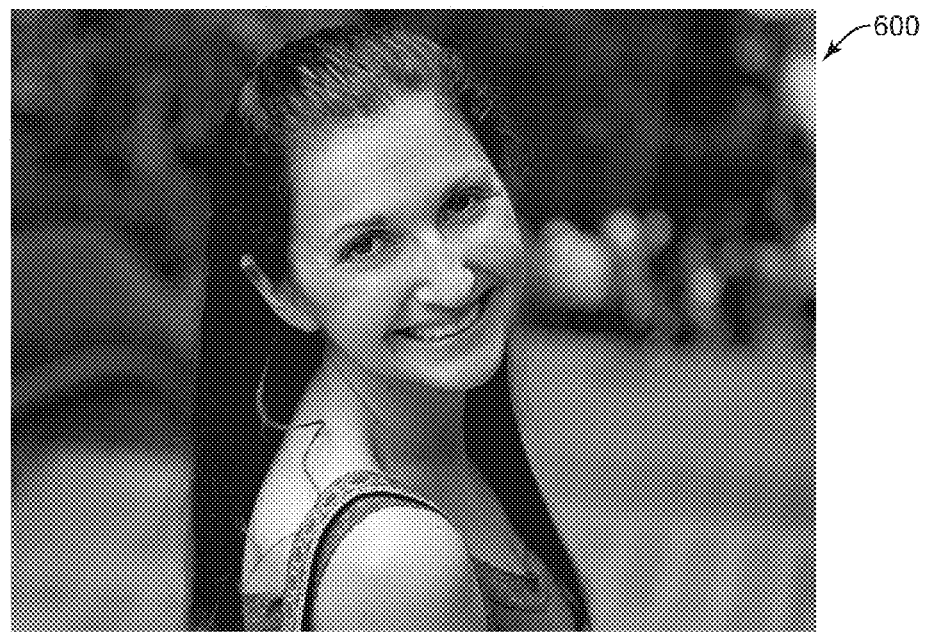
FIGS. 6-10 are diagrammatic illustrations of examples of processing an example image to smooth image pixels using one or more features described herein.

FIGS. 6-10 are diagrammatic illustrations of some examples of processing an example image to smooth image pixels using one or more features described herein. Image 600 as shown in FIG. 6 can be the input image that is the basis for pixel blurring according to one or more implementations described herein. Image 600 can be displayed on a display device, e.g., of a client device 120, 122, 124, and/or 126 of FIG. 1, or a server system 102 in some implementations. In other implementations, the image 600 can be processed as described herein without being displayed or being displayed after all processing is complete. In one non-limiting example, a user can view image 600 in an interface on a client device, e.g., for a social networking service or application.

Figure 7:

FIG. 7 shows one example of a boundary map 700 determined based on the image 600 of FIG. 6. Boundary map 700 includes gray (flat), white (positive slope), and black (negative slope) labels as described in examples above. In this example, the map 700 is determined by performing a difference of Gaussians based on two Gaussian blurs of the input image 600. The parameters of the two Gaussian blurs were set such that some smaller details in the image are represented with black and white map pixels, such as many color changes occurring in the depicted face. In one example, the sigma (σ) value of one Gaussian blur was set to 2.2, and the sigma of the other Gaussian blur was set to 1.1.

Figure 8:

FIG. 8 shows an example output image 800 resulting from implementing features described herein, such as the method of FIG. 4, when using the boundary map 700 of FIG. 7. An amount of blurring has been provided to the output pixels while retaining sharp edges as delineated in the boundary map.

Figure 9:
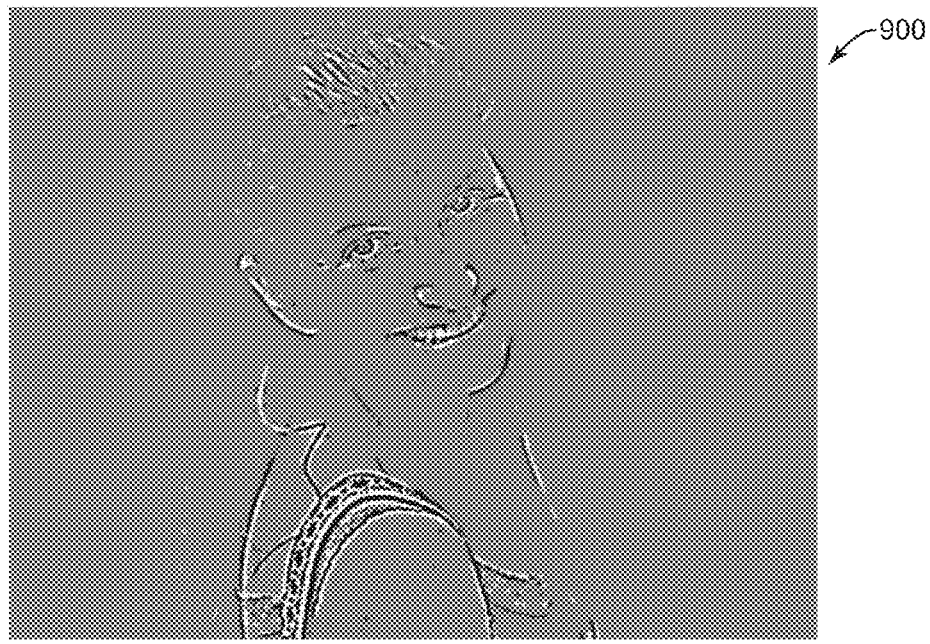

FIG. 9 shows another example of a boundary map 900 determined based on the image 600 of FIG. 6. In this example, the parameters of the two Gaussian blurs were set such that more of the smaller or less-contrasted details in the image are not represented with black and white map pixels as compared to the boundary map 700, where these details have been instead included in the gray-labelled pixel regions. In one example, the sigma (σ) value of one Gaussian blur was set to 3.2, and the sigma of the other Gaussian blur was set to 1.6.

Figure 10:

FIG. 10 shows an example output image 1000 resulting from implementing features described herein, such as the method of FIG. 4, when using the boundary map 900 of FIG. 9. Fewer sharp edges and more blurring result in the output image as compared to the output image 800, since less such edges are shown in the boundary map 900 as compared to boundary map 700.

Thus, described features provide processes that can smooth image pixels while being aware of color edges in the image, thus allowing such edges to be retained through the smoothing process. The size, scale, or thickness of the edges desired to be retained in the image can be adjusted based on parameters used in determining a boundary map. Users do not need to manually select any regions or boundaries for smoothing, nor manually make adjustments to retain edges in the image. Furthermore, features provide efficient processing for the smoothing operations.

Figure 11:
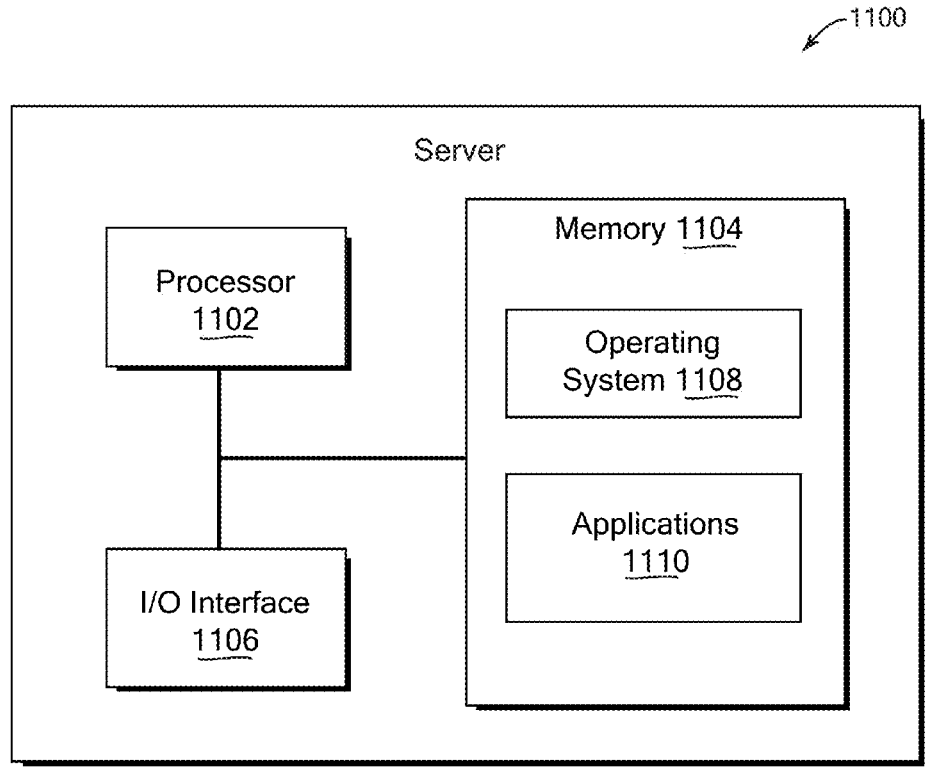
FIG. 11 is a block diagram of an example device which may be used for one or more implementations described herein.

FIG. 11 is a block diagram of an example device 1100 which may be used to implement some implementations described herein. In one example, device 1100 may be used to implement server device 104 of FIG. 1, and perform appropriate method implementations described herein. Server device 1100 can be any suitable computer system, server, or other electronic or hardware device. For example, the server device 1100 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 1100 includes a processor 1102, a memory 1104, and input/output (I/O) interface 1106.

Processor 1102 can be one or more processors or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108 and one or more applications engines 1110 such as a graphics editing engine, web hosting engine, social networking engine, etc. In some implementations, the applications engine 1110 can include instructions that enable processor 1102 to perform the functions described herein, e.g., some or all of the methods of FIGS. 2, 3 and/or 4. Any of software in memory 1104 can alternatively be stored on any other suitable storage location or computer-readable medium. In addition, memory 1104 (and/or other connected storage device(s)) can store settings, content, and other data used in the features described herein. Memory 1104 and any other type of storage (magnetic disk, optical disk, magnetic tape, or other tangible media) can be considered "storage devices."

I/O interface 1106 can provide functions to enable interfacing the server device 1100 with other systems and devices. For example, network communication devices, storage devices such as memory and/or database 106, and input/output devices can communicate via interface 1106. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 11 shows one block for each of processor 1102, memory 1104, I/O interface 1106, and software blocks 1108 and 1110. These blocks may represent one or more processors or processing circuitries, operating systems, memories, I/O interfaces, applications, and/or software modules. In other implementations, server device 1100 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 1100, such as processor(s) 1102, memory 1104, and I/O interface 1106. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   determining a boundary map for an input image, wherein the boundary map associates one of a plurality of different labels to each pixel of the input image, wherein the labels indicate one or more edges in the input image;
   determining a set of input pixels of the input image eligible to influence an output pixel of an output image, wherein the output pixel corresponds to a pixel of the input image; and
   determining a blurred pixel value for the output pixel, wherein the blurred pixel value is based on the set of input pixels and associated labels from the boundary map that correspond to the set of input pixels, wherein the associated labels are used to reduce blurring in the output image of any of the one or more edges present in the set of input pixels.

2. The method of claim 1 wherein each label indicates a color value change for the associated pixel with respect to one or more other pixels of the input image.

3. The method of claim 1 wherein determining a blurred pixel value includes:
   determining an associated label from the boundary map corresponding to each of the input pixels;
   determining one or more value contributions from the input pixels based on the corresponding label for the input pixel; and
   using one or more value contributions from the input pixels having the same label as the pixel in the input image corresponding to the output pixel.

4. The method of claim 1 wherein determining a boundary map for an input image includes performing a difference of Gaussians between a first blurred image and a second blurred image, wherein the first blurred image and the second blurred image are based on the input image.

5. The method of claim 1 wherein each label of the boundary map indicates a change in a color value of the pixel over a predetermined threshold, and wherein the labels include a label for indicating an increase in the color value, a label for indicating a decrease in the color value, and a label for indicating no change in the color value within the predetermined threshold.

6. The method of claim 3 wherein determining one or more value contributions from the input pixels includes:
   traversing the input pixels in the image in a direction from an origin pixel of the input image that corresponds to the output pixel; and
   in response to a particular input pixel having a different label than the origin pixel, determining that the particular input pixel and all further input pixels past that particular input pixel in the direction have a reduced contribution to the blurred pixel value, thereby reducing blurring an edge indicated by the different label.

7. The method of claim 3 wherein determining the blurred pixel value for the output pixel includes value contributions from input pixels in only a single spatial dimension of the input image.

8. The method of claim 7 further comprising:
   determining associated labels and value contributions from a set of output pixels in the output image in a different dimension in the input image than the input pixels, and determining a final blurred pixel value for a final output pixel of a second output image based on the value contribution from one or more of the output pixels.

9. The method of claim 1 wherein the set of input pixels are determined by a kernel including a plurality of kernel values, each kernel value associated with one of the input pixels aligned with the kernel value.

10. The method of claim 9 wherein determining a blurred pixel value includes:
    traversing the input pixels in the input image in a direction from an origin pixel of the input image that corresponds to the output pixel, to the borders of the kernel; and
    for each traversed input pixel:
    in response to the input pixel having a different label than the origin pixel, determining that the input pixel and all input pixels past that input pixel in the direction have a reduced contribution to the blurred pixel value, thereby preserving an edge indicated by the different label; and
    in response to the input pixel having the same label as the origin pixel, determining a product of the associated kernel value and a color value of the input pixel, wherein the product is the value contribution for the input pixel.

11. The method of claim 2 wherein the value contribution is determined based on a kernel that indicates the input pixels in the image, wherein the kernel is one of: a box blur kernel and a Gaussian blur kernel.

12. The method of claim 1 further comprising accumulating multiple total contribution values, each total contribution value accumulated in a different buffer corresponding to one of the labels, wherein the contribution values from input pixels associated with the same label are accumulated in the same buffer.

13. The method of claim 1 wherein each label is associated with a plurality of buffers to accumulate total contribution values, wherein each buffer accumulates contribution values from contiguous input pixels having the same associated labels within the set of input pixels.

14. The method of claim 1 further comprising obtaining blurred pixel values for a plurality of output pixels corresponding to a plurality of the input pixels, wherein an average of value contributions from a different set of input pixels is obtained for each blurred pixel value by using a moving average of the value contributions over the different sets of input pixels using a box filter.

15. A method comprising:
  determining a boundary map for an input image, wherein the boundary map associates one of a plurality of different labels to each pixel of the input image, and wherein the labels indicate one or more edges in the input image;
  providing a kernel including a plurality of kernel values corresponding to input pixels of the image and designating an origin pixel of the input image;
  for one or more input pixels designed by the kernel:
    determining an associated label from the boundary map corresponding to the input pixel; and
    determining a contribution from the input pixel based on the corresponding label of the boundary map compared to an associated label of the origin pixel, wherein the contribution from the input pixel is reduced in response to the label indicating a presence of an edge of the one or more edges to cause a reduction of blurring of the edge in an output image; and
  determining a blurred pixel value for an output pixel of an output image, the output pixel corresponding to the origin pixel, wherein the blurred value is based on the contribution from each input pixel.

16. The method of claim 15 wherein one or more input pixels designated by the kernel are examined by traversing the input pixels from the origin pixel in a direction towards a boundary of the kernel, wherein in response to determining that a particular input pixel has a different label than the label of the origin pixel, the particular input pixel and all further input pixels past that particular input pixel in the direction are reduced in their contribution to the blurred pixel value.

17. The method of claim 15 wherein each label indicates a color value change for the associated pixel with respect to one or more other pixels of the input image, and wherein determining the blurred pixel value for the output pixel includes value contributions from input pixels in only a single spatial dimension of the input image.

18. A system comprising:
  a storage device; and
  at least one processor accessing the storage device and operative to perform operations comprising:
    determining a boundary map for an input image, wherein the boundary map associates one of a plurality of different labels to each pixel of the input image, and wherein the labels indicate one or more edges in the input image;
    determining a set of input pixels of the input image eligible to influence an output pixel of an output image, wherein the output pixel corresponds to a pixel of the input image; and
    determining a blurred pixel value for the output pixel, wherein the blurred pixel value is based on the set of input pixels and associated labels from the boundary map that correspond to the set of input pixels, wherein the associated labels are used to reduce blurring in the output image of any of the one or more edges present in the set of input pixels.

19. The system of claim 18 wherein determining a blurred pixel value includes:
  determining an associated label from the boundary map corresponding to each of the input pixels; and
  determining one or more value contributions from the input pixels based on the corresponding label for the input pixel,
  wherein determining the blurred pixel value for the output pixel includes using one or more value contributions from the input pixels having the same label as the pixel in the input image corresponding to the output pixel.

20. The system of claim 18 wherein one or more of pixels in the set of input pixels are examined by traversing the one or more input pixels from the origin pixel in a direction away from the origin pixel, wherein in response to determining that a particular input pixel has a different label than the label of the origin pixel, the particular input pixel and all further input pixels past that particular input pixel in the direction are reduced in their contribution to the blurred pixel value.

* * * * *